(12) United States Patent
Walter

(10) Patent No.: US 6,787,958 B1
(45) Date of Patent: Sep. 7, 2004

(54) ELECTRICAL MACHINES

(75) Inventor: Richard Thomas Walter, Towson, MD (US)

(73) Assignees: Black & Decker Inc., Newark, DE (US); University of Warwick, Warwickshire (GB)

(*) Notice: Subject to any disclaimer, the term of this patent is extended or adjusted under 35 U.S.C. 154(b) by 779 days.

(21) Appl. No.: 10/018,736

(22) PCT Filed: Jun. 23, 2000

(86) PCT No.: PCT/GB00/02439

§ 371 (c)(1),
(2), (4) Date: Apr. 22, 2002

(87) PCT Pub. No.: WO01/03272

PCT Pub. Date: Jan. 11, 2001

(30) Foreign Application Priority Data

Jul. 2, 1999 (GB) .............................................. 9915370

(51) Int. Cl.[7] .......................... H02K 17/00; H02K 1/10; H02K 21/04; H02K 1/16

(52) U.S. Cl. ...................... 310/168; 310/166; 310/162; 310/181; 310/154; 310/216; 310/190; 310/186

(58) Field of Search ................................ 310/184, 216, 310/168, 166

(56) References Cited

U.S. PATENT DOCUMENTS

| | | | | |
|---|---|---|---|---|
| 2,812,459 A | * | 11/1957 | Smith .......................... | 310/198 |
| 2,830,209 A | * | 4/1958 | Fwckenstein ............... | 310/216 |
| 4,864,177 A | * | 9/1989 | Yang ........................... | 310/216 |
| 5,015,905 A | * | 5/1991 | Koharagi .................... | 310/186 |

(List continued on next page.)

FOREIGN PATENT DOCUMENTS

| | | |
|---|---|---|
| GB | 0 698 527 | 7/1952 |
| GB | 1 226 427 | 6/1968 |

(List continued on next page.)

OTHER PUBLICATIONS

Search Report regarding corresponding application No. GB 9915370.2 dated Nov. 26, 1999.

*Primary Examiner*—Nestor Ramirez
*Assistant Examiner*—Iraj A Mohandesi
(74) *Attorney, Agent, or Firm*—Renner, Otto, Boisselle & Sklar

(57) ABSTRACT

An electrical motor or generator comprises a rotor 79 without windings, a stator 78 having armature windings comprising at least two coils $A_1$, $A_2$ having active portions positioned within armature winding slots 81 in a stator iron, and field windings F having active portions positioned within field winding slots 80 in the stator iron. An electronic control circuit is provided for controlling the currents in the coils $A_1$, $A_2$ in synchronism with rotation of the rotor such that periods in which a magnetomotive force is generated in one direction by current flow in one of the coils alternate with periods in which a magnetomotive force is generated in the opposite direction by current flow in another of the coils. The armature winding slots and the field winding slots are equal in number and alternate with one another in the stator iron. Furthermore, considering the width of each slot 80, 81 as being the maximum extent of the slot in the direction of rotation of the rotor and considering the depth of each slot as being the maximum extent of the slot radially of the rotor and the thickness of the back iron behind the slot as being the distance between the maximum extent of the slot and the maximum extent of the armature iron along the same radial direction, the width of each armature slot 81 is greater than the width of each field winding slot 80 and the thickness of the back iron behind each armature winding slot 81 is greater than the thickness of the back iron behind each field winding slot 80. Such an arrangement optimises the power efficiency whilst making best use of the magnetic material.

10 Claims, 5 Drawing Sheets

U.S. PATENT DOCUMENTS 5,751,087 A * 5/1998 Yang .......................... 310/179
5,825,113 A * 10/1998 Lipo
5,866,964 A    2/1999 Li
6,140,729 A * 10/2000 Pollock ...................... 310/166

FOREIGN PATENT DOCUMENTS

WO     80/02216     10/1980
WO     96/38903     12/1996

* cited by examiner

ELECTRICAL MACHINES

This invention relates to electrical machines.

FIGS. 1a and 1b shows a conventional two-phase variable reluctance motor comprising a stator 2 having two pairs 3, 4 of oppositely disposed inwardly directed salient poles provided with two pairs 5, 6 of energising windings corresponding to the two phases, and a rotor 7 having a single pair 8 of oppositely disposed outwardly directed salient poles without windings. Each of the four energising windings is wound about its corresponding pole, as indicated by the symbols Y—Y denoting two diametrically opposite portions of each winding of the winding pair 6 and the symbols X—X denoting two diametrically opposite portions of each winding of the winding pair 5. An excitation circuit (not shown) is provided for rotating the rotor 7 within the stator 2 by alternately energising the stator windings in synchronism with rotation of the rotor so that torque is developed by the tendency of the rotor 7 to arrange itself in a position of minimum reluctance within the magnetic field produced by the windings, as will be described in more detail below. Such a variable reluctance motor offers the advantage over a conventional wound rotor motor that a commutator and brushes, which are wearing parts, are not required for supply of current to the rotor. Furthermore other advantages are provided because there are no conductors on the rotor and high-cost permanent magnets are not required.

The symbols + and − in FIGS. 1a and 1b show the directions of current flow in the windings in the two alternate modes of excitation in which the rotor 7 is attracted either to the horizontal position or to the vertical position as viewed in the figures. It will be appreciated that rotation of the rotor 7 requires alternate energisation of the winding pairs 5 and 6, preferably with only one winding pair 5 or 6 being energised at a time, and with the current usually being supplied to each winding pair 5 or 6 in only one direction during such energisation. However the windings can only be energised for a maximum of half the time per revolution if useful torque is to be produced, so that highly efficient utilisation of the electric circuit is not possible with such a motor.

By contrast a fully pitched two-phase variable reluctance motor, as described by J. D. Wale and C. Pollock, "Novel Converter Topologies for a Two-Phase Switched Reluctance Motor with Fully Pitched Windings", IEEE Power Electronics Specialists Conference, Braveno, June 1996, pp. 1798–1803 and as shown in FIGS. 2a and 2b (in which the same reference numerals are used to denote like parts as in FIGS. 1a and 1b), comprises two windings 10 and 11 having a pitch which is twice the pole pitch of the motor, that is 180° in the example illustrated, and disposed at 90° to one another. The winding 11 may be wound so that one part of the winding on one side of the rotor 7 fills a stator slot 12 defined between adjacent poles of the pole pairs 3, 4, and another part of the winding 11 on the diametrically opposite side of the rotor 7 fills a stator slot 13 defined between two further adjacent poles of the pole pairs 3, 4. The winding 10 has corresponding parts filling diametrically opposed stator slots 14 and 15. Thus the two windings 10 and 11 span the width of the motor with the axes of the windings 10, 11 being at right angles to one another.

Furthermore two alternate modes of excitation of such a motor corresponding to the horizontal and vertical positions of the rotor 7 are shown in FIGS. 2a and 2b from which it will be appreciated that both windings 10, 11 are energised in both modes of excitation, but that, whereas the direction of current flow in the winding 10 is the same in both modes, the direction of current flow in the winding 11 changes between the two modes. Since current is supplied to both phase windings 10, 11 in both modes and since each winding 10 or 11 occupies half the total stator slot area, such a system can achieve 100% utilisation of its slot area. This contrasts with the 50% utilisation achieved with the conventional wound variable reluctance motor described above in which only one phase winding is energised at a time. Furthermore, since there is no requirement for the direction of current in the winding 10 to change, the winding 10, which may be termed the field winding, can be supplied with direct current without any switching which leads to simplification of the excitation circuit used. However the winding 11, which may be termed the armature winding, must be energised with current which alternates in synchronism with the rotor position so as to determine the changing orientation of the stator flux required to attract the rotor alternately to the horizontal and vertical positions. Such a motor may be termed "a flux-switching motor". The need to supply the armature winding with alternating current in such a motor can result in an excitation circuit of high complexity and cost.

J. R. Surano and C-M Ong, "Variable Reluctance Motor Structures for Low-Speed Operation", IEEE Transactions on Industry Applications, Vol.32, No.2, March/April 1996, pp 808–815 and UK Patent No. 2262843 also disclose fully pitched two-phase variable reluctance motors. The motor disclosed in UK Patent No. 2262843 is a three-phase variable reluctance motor having three windings which must be energised with current in synchronism with rotation of the rotor so that such a motor requires an excitation circuit of high complexity.

WO 98/05112 discloses a fully pitched two-phase variable reluctance motor having a four-pole stator 2 which, as shown diagranmatically in FIG. 3, is provided with a field winding 10 and an armature winding 11 each of which is split into two coils 22 and 23 or 24 and 25 closely coupled and wound so that diametrically opposite portions of both coils are disposed within diametrically opposite stator slots. FIG. 4 shows a generalised circuit diagram for energising the armature coils 24 and 25. The coils 24 and 25 are connected within the circuit so that direct current supply to the terminals 26 and 27 flows through both coils 24 and 25 in the same direction so as to generate magnetomotive forces in opposite direction as a result of the opposite winding of the coils. Switches 28 and 29, which may comprise field effect transistors or thyristors for example, are connected in series with the coils 24 and 25 and are switched alternately to effect alternate energisation of the coils 24 and 25 so as to provide the required magnetomotive forces acting in opposite directions. It is an advantage of such an arrangement that the armature winding is made up of two closely coupled coils which enables each coil to be energised with current in only one direction so that relatively simple excitation circuitry can be used.

GB 18027 dated Sep. 9, 1901 discloses a variable reluctance machine having sets of windings on the stator which are alternately energised so as to provide the required interaction with the rotor. Furthermore GB 554827 discloses an inductor alternator in which the relative arrangement of the stator and rotor teeth produces successive zones of relatively high and low reluctance, and in which field and alternative current windings are provided on the stator to effect the required energisation. However, neither of these prior arrangements possesses the advantageous feature of the arrangement of WO 98/05112.

It is an object of the invention to provide an electrical machine exhibiting high power efficiency which can be produced at relatively low cost.

According to the present invention, there is provided an electrical machine comprising a rotor without windings, a stator having armature windings comprising at least two coils having active portions positioned within armature winding slots in a stator iron, and field windings having active portions positioned within field winding slots in the stator iron so as to generate magnetomotive forces in directions extending transversely of the magnetomotive forces generated by the armature windings, and circuit means for controlling the currents in the coils in synchronism with rotation of the rotor such that periods in which a magnetomotive force is generated in one direction by current flow in one of the coils alternate with periods in which a magnetomotive force is generated in the opposite direction by current flow in another of the coils, characterised in that the armature winding slots and the field winding slots are equal in number and alternate with one another in the stator iron, and in that, considering the width of each slot as being the maximum extent of the slot in the direction of rotation of the rotor and considering the depth of each slot as being the maximum extent of the slot radially of the rotor and the thickness of the back iron behind the slot as being the distance between the maximum extent of the slot and the maximum extent of the armature iron along the same radial direction, the width of each armature winding slot is greater than the width of each field winding slot and the thickness of the back iron behind each armature winding slot is greater than the thickness of the back iron behind each field winding slot.

Such an arrangement allows the slots for the armature windings and the field windings to be adapted to the particular requirements of the windings so as to optimise the power efficiency whilst making best use of magnetic material. Typically, where the stator has a circular cross-section, the field windings need to carry only DC current so that their self-inductance is relatively unimportant and thus the field winding slots can be relatively narrow and deep without compromising the performance. On the other hand, it is desirable for the armature winding slots to be relatively wide and shallow to reduce the self-inductance. This ensures a relatively thick back iron to the stator windings in order to limit iron losses. The relatively thinner back iron behind the field windings does not generate high iron losses in view of the substantially constant level of the magnetic flux associated with the field windings.

In order that the invention may be more fully understood, reference will now be made, by way of example, to the accompanying drawings, in which:

FIGS. 1(a), 1(b) and 2(a), 2(b) are explanatory diagrams showing a conventional flux-switching motor, with the two excitation modes in each case being shown in FIGS. 1(a) and 1(b) or FIGS. 2(a) and 2(b), as the case may be;

The following description of embodiments of the invention is given with reference to a flux-switching motor having a four-pole stator and a two-pole rotor, the stator being provided with a field winding 10 and an armature winding 11 split into two coils 24 and 25 which are closely coupled and wound so that diametrically opposite portions of the coils are disposed within diametrically opposite stator slots. The two armature coils are referred to as $A_1$ and $A_2$ for the purposes of further explanation.

Figure 1A:
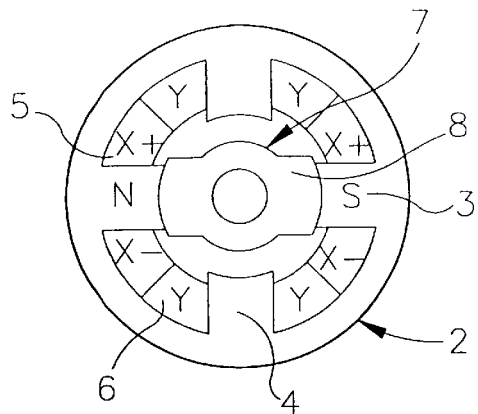
Figure 1B:
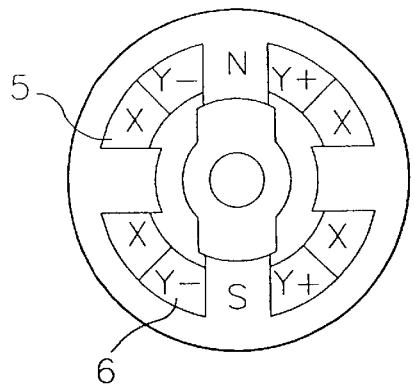
Figure 2A:
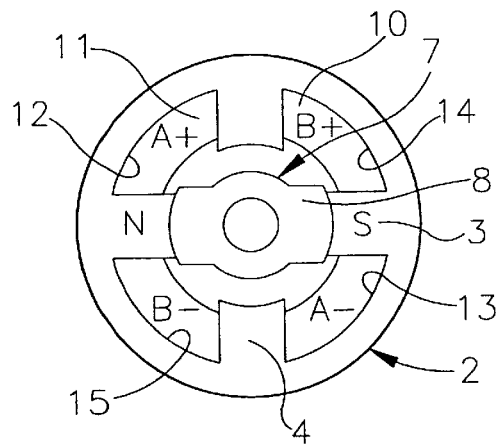
Figure 2B:
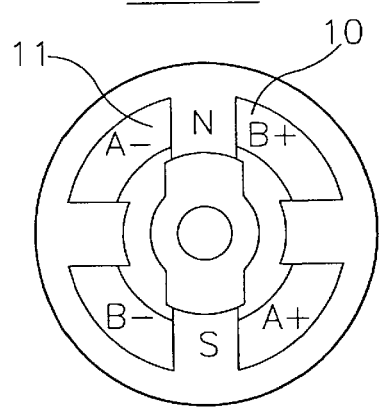
Figure 3:
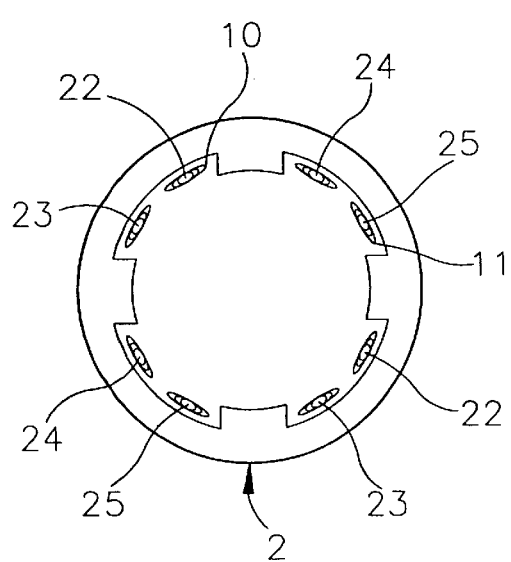
FIGS. 3 and 4 are explanatory diagrams showing the stator windings for a flux-switching motor as disclosed in WO 98/05112.
Figure 4:
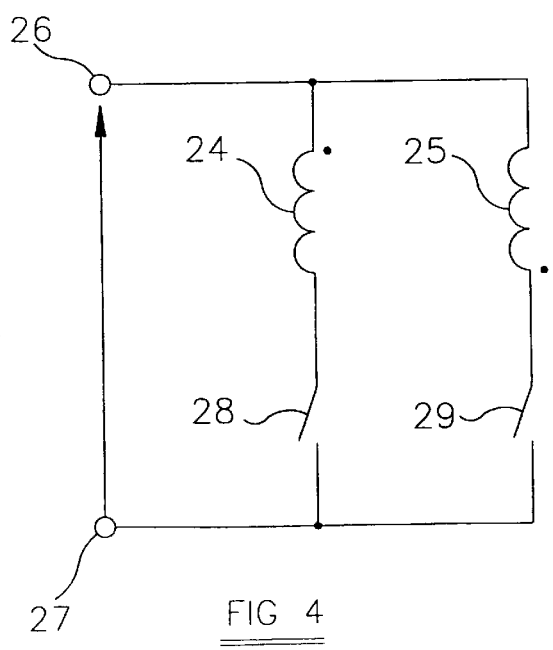
Figure 5:
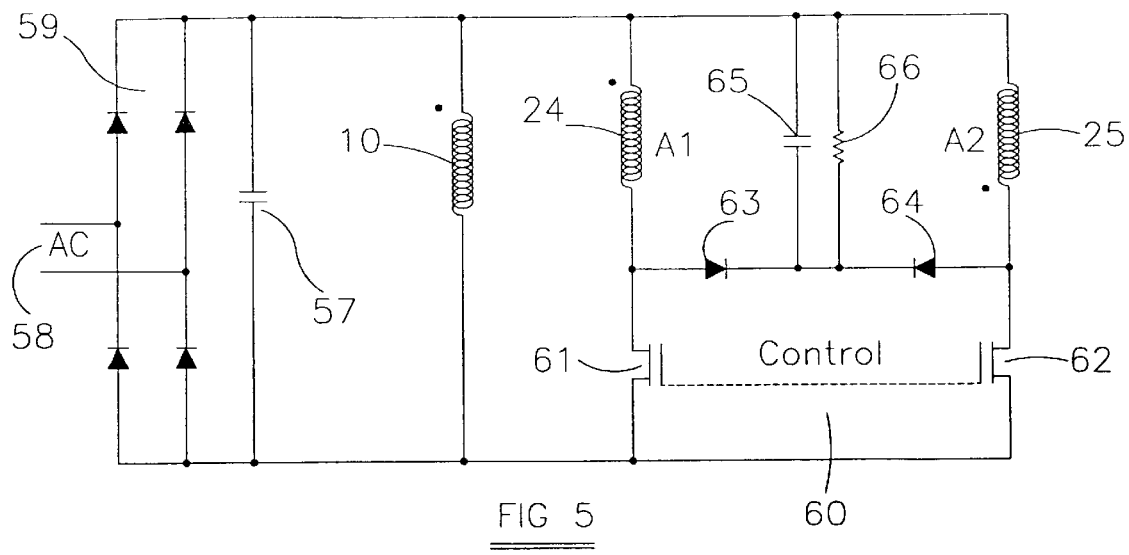
FIG. 5 is a circuit diagram showing a circuit arrangement for energising the field and armature windings of an embodiment of the invention.

In the circuit of FIG. 5 the field winding 10 is connected in parallel with the armature coils 24 and 25 and a capacitor 57 which allows the currents through the field winding 10 and the armature coils 24 and 25 to be different. The circuit is supplied from an alternating current source 58 by way of a rectifier bridge 59, and a switching control circuit 60 is provided to supply current alternately to the armature coils 24 and 25 so as to provide the require magnetomotive forces acting in opposite directions to rotate the rotor. In this case the circuit arrangement 60 incorporates two switches 61 and 62 which are preferably MOSFET's and two diodes 63 and 64, together with a snubber section comprising a capacitor 65 and a resistor 66. The provision of the snubber section is required because there is not an instantaneous and lossless transfer of energy from one armature coil to the other at the turn off of one of the switches 61 and 62, and thus the snubber section is required to capture the uncoupled energy and prevent it from destroying the switches.

In operation the switches 61 and 62 are switched alternately by the switching control circuit which is of a type well known in the motor art so that this circuit will not be described in detail in this specification. The armature coils 24 and 25 are thereby energised alternately so that, due to the opposite winding of the coils, magnetomotive forces in opposite directions are generated alternately in synchronism with rotation of the rotor. Furthermore it should be understood that various modifications and variations of the described circuit arrangement are possible, as will be apparent from consideration from the different circuit arrangements disclosed in WO 98/05112.

Figure 6:
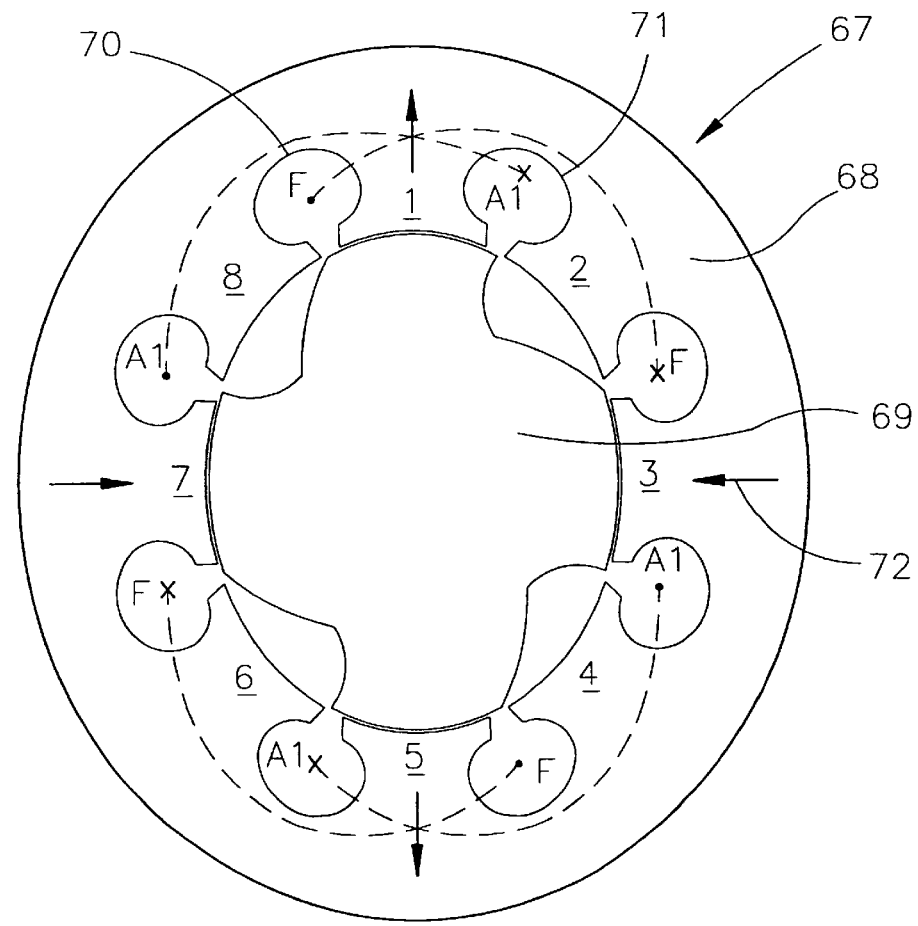
FIGS. 6, 7 and 8 are schematic diagrams showing the flux paths in the two excitation modes of the embodiment of the invention.
Figure 7:
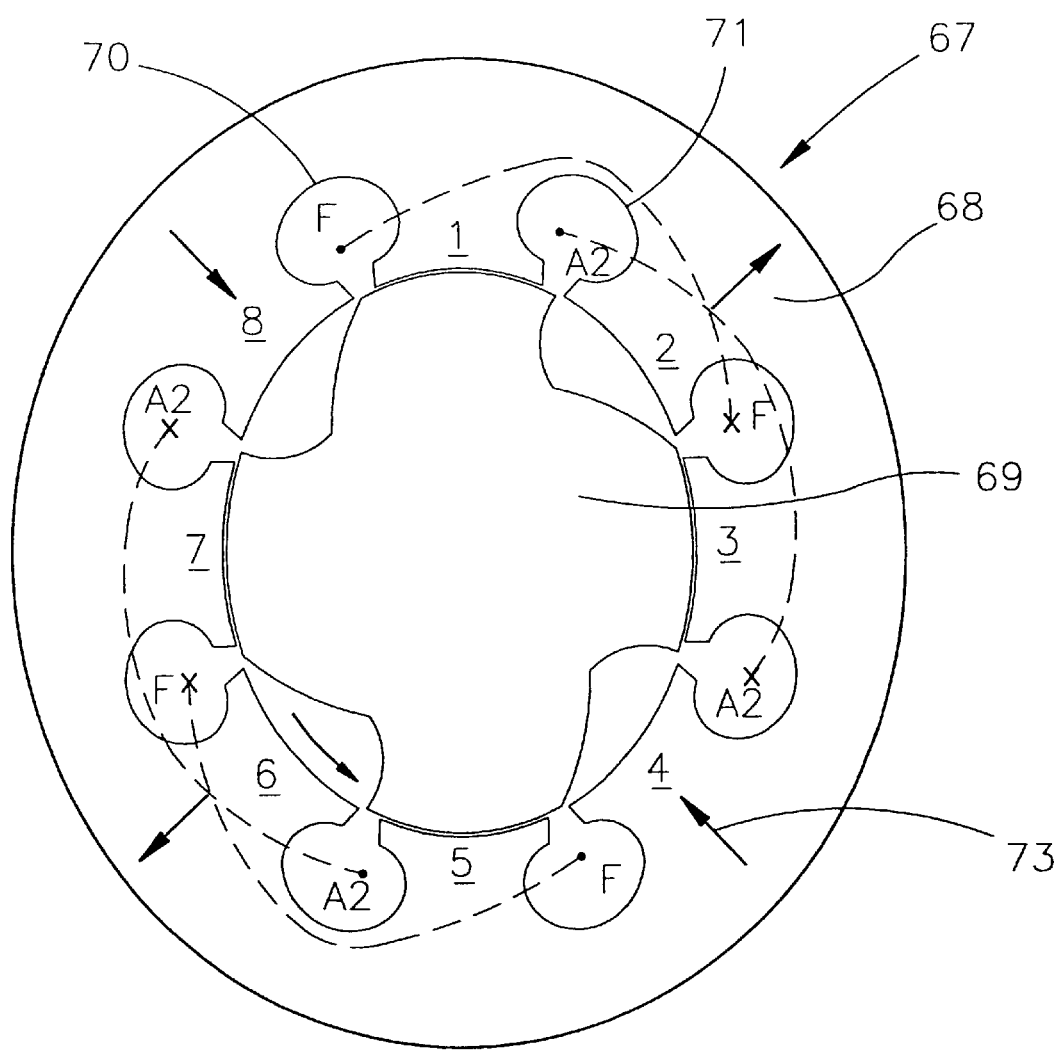
Figure 8:
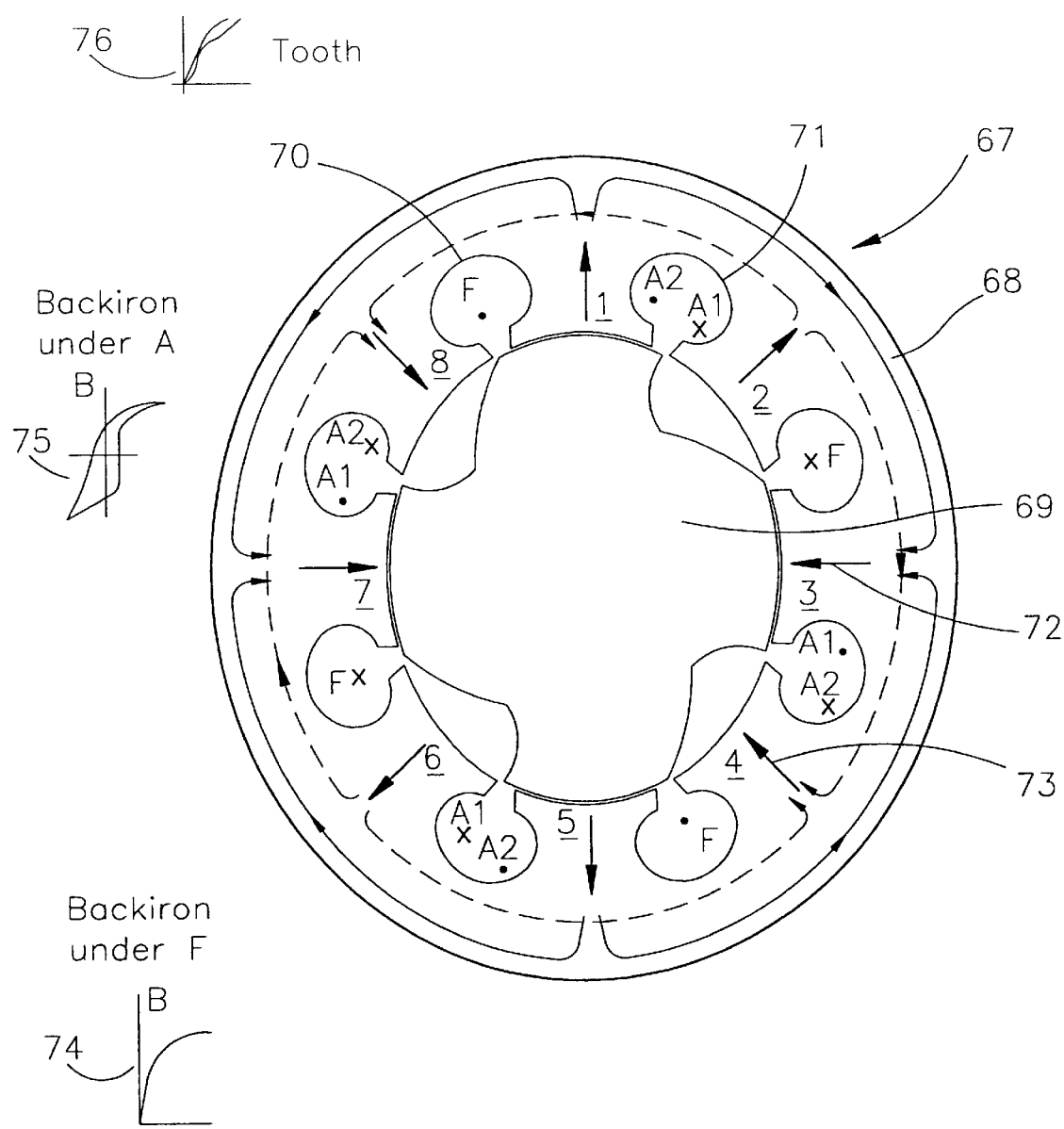

Reference will now be made to the explanatory diagrams of FIGS. 6 to 8 showing a flux-switching motor 67 comprising a stator 68 having eight poles and a rotor 69 having four poles with the field and armature coils being received in re-entrant slots 70 and 71 in the stator 68. FIG. 6 shows two field coils F and two armature coils $A_1$ wound so that each coil spans two pole pitches. Furthermore FIG. 7 shows two field coils F and two armature coils $A_2$ again wound so that each coil spans two pole pitches. The armature coils $A_1$ and $A_2$ are positioned in common slots 71 and connected together in pairs with the coils of each pair being connected in series or in parallel so as to correspond to the coils 24 and 25 in the circuit diagram of FIG. 5. The field coils F are also connected in series or in parallel so as to correspond to the field coil 10 in FIG. 5. The coils $A_1$ and $A_2$ are closely coupled, for example by being wound in bifilar fashion. Alternatively four armature coils and/or four field coils may be provided in such an arrangement with the coils being connected in series or in parallel.

FIG. 6 shows by arrows 72 the direction of flux flow when the circuit of FIG. 5 produces unidirectional current flow in the armature coils $A_1$ and the field coils F. The armature coils $A_2$ are omitted from FIG. 6 to make the figure easier to read, since these coils are not excited in this mode. In this case the flux flows predominantly in the stator teeth 1, 3, 5 and 7 which are aligned with the teeth of the rotor 69 in the position shown, with there being little flux flow in the stator teeth 2, 4, 6 and 8. FIG. 7 shows by arrows 73 the direction of flux flow when the circuit of FIG. 5 produces unidirectional current flow in the armature coils $A_2$ and the field coils F. The armature coils $A_1$ are omitted from FIG. 7 to make the figure easier to read, since these coils are not excited in this mode. In this case the flux flows predominantly in the stator teeth 2, 4, 6 and 8 which are out of alignment with the teeth of the rotor 69 in the position shown, with there being little flux flow in the stator teeth 1, 3, 5 and 7, so that a force is exerted which tends to turn the rotor 69 anti-clockwise. FIG. 8 shows the flux lines associated with the currents in the armature coils $A_1$ and $A_2$ and the field coils F in operation of such a motor wound with such coils in the manner shown in FIGS. 6 and 7. The bold solid lines in this figure denote the flux lines associated with excitation of the field coils F and the armature coils $A_1$, whereas the light broken lines denote the flux lines associated with excitation of the field coils F and the armature coils $A_2$. This shows that the flux always flows in the same direction in the iron of the stator 68 behind the field coils F whereas the flux behind the armature coils $A_1$ and $A_2$ varies from saturation in one polarity to saturation in the other polarity as a result of the flux reversals caused by alternate energisation of the armature coils $A_1$ and $A_2$, as shown in the inset graph 75. The flux in the stator teeth varies from near zero to saturation in one polarity only, as indicated by the inset graph 76.

Figure 9:
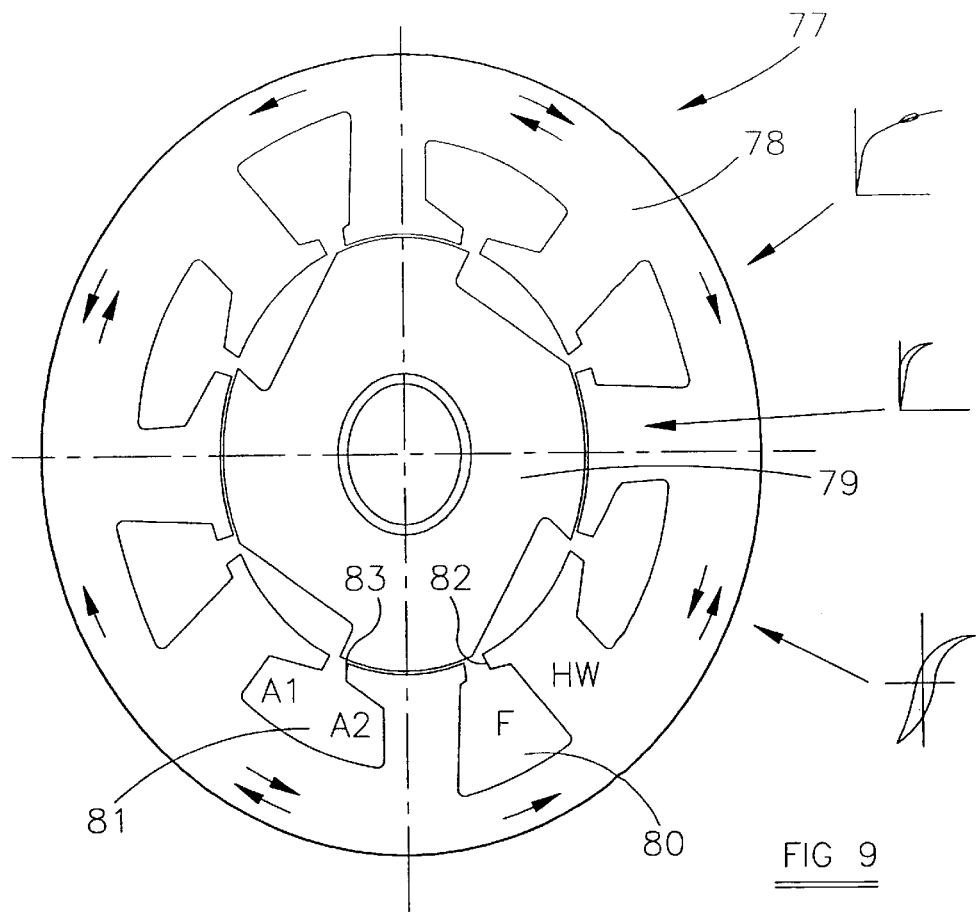
FIG. 9 is a radial section through an embodiment of the invention.

In accordance with the invention, the slots in the armature are designed to optimise the performance of the motor and to make best use of the magnetic material. FIG. 9 shows a flux-switching motor 77 having a stator 78 with eight poles and a rotor 79 with four poles, the stator 78 being formed with relatively narrow and relatively deep slots 80 for the field coils and relatively wide and relatively shallow slots 81 for the armature coils $A_1$ and $A_2$. Since the armature slots 81 must accommodate two armature coils $A_1$ and $A_2$, these slots should be relatively wide, whereas the slots 81 should be relatively shallow so as to provide a relatively thick area of back iron behind the armature coils to minimise iron losses due to flux reversals. On the other hand, the area of back iron behind the field coils can be made much thinner because the substantially constant level of flux behind the field coils does not generate high iron losses. Thus the field slots 80 may be made relatively deep and also relatively narrow because each slot is required to accommodate only one field coil F. In this regard it should be noted that, since the field coil carries only DC current, its self-inductance is relatively unimportant. Such an arrangement ensures not only better magnetic coupling between the armature coils $A_1$ and $A_2$ to minimise commutation energy losses, but also better use of magnetic material in such a manner as to decrease iron losses. This allows the power to weight ratio of the motor to be optimised.

In a preferred design the relative proportions of the field slots 80 and the armature slots 81 are such that there is between 10% and 300%, and preferably between 25% and 150%, greater thickness of back iron behind the armature slots 81 than behind the field slots 80. Most preferably the relative proportions of the field slots 80 and the armature slots 81 are such that there is between 50% and 100% greater thickness of back iron behind the armature slots 81 than behind the field slots 80. Furthermore, the maximum width of the armature slots 81 is greater than the maximum width of the field slots 80 by between 20% and 80%, and most preferably about 50%. As shown in FIG. 9, the field and armature slots 80, 81 are preferably necked at their outlets to provide narrow openings 82 and 83 where the slots 80 and 81 face the rotor 79. This serves to ensure that the reluctance of the magnetic paths seen by the windings is approximately constant with rotor position, since there will be a substantially constant angle of overlap between the rotor and stator poles whatever the position of the rotor. This is also ensured by shaping the rotor poles so that they have a large pole width with sufficient overlap relative to adjacent stator poles, as shown in FIG. 9. Preferably the width of the opening 82 is substantially the same as the width of the opening 83, although some differences between these two widths can be tolerated.

Figure 10:
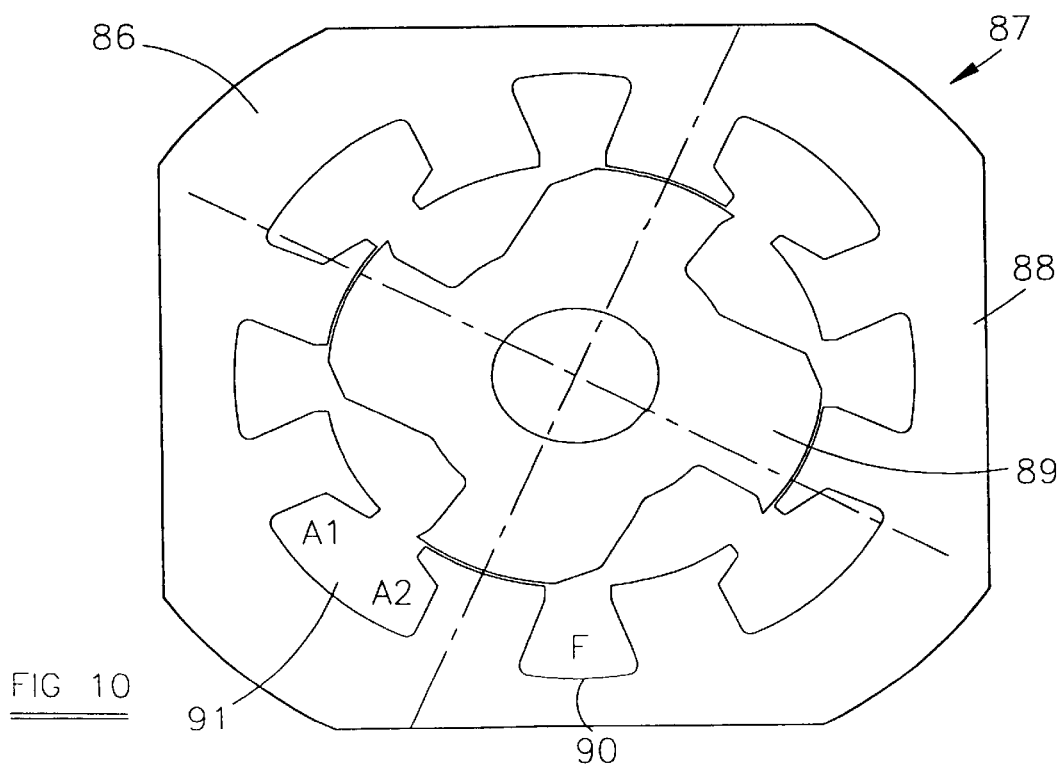
FIG. 10 is a radial section through a variant embodiment.

FIG. 10 shows a flux-switching motor 87 having a stator 88 with eight poles and a rotor 89 with four poles. In this case the stator 88 has a substantially rectangular cross-section with cut-away comers 86. Such a stator cross-section is advantageous since, by suitable positioning of the field slots 90 and armature slots 91 such that the four armature slots 91 are positioned opposite the comers 86, it is possible to ensure that a substantial thickness of back iron is provided outside the armature slots in order to minimise iron losses. Furthermore, since such a thickness of back iron is provided due to the inherent shape of the stator 88, it is not necessary for the stator slots 91 to be significantly shallower than the field slots 90 (as is necessary in the embodiment of FIG. 9), and instead the armature slots 91 may be made as deep as, or deeper than, the field slots 90 in order to provide increased capacity for the armature coils $A_1$ and $A_2$. The cut-away comers 86 permit the motor to be accommodated within a casing of substantially circular cross-section.

It will be appreciated that other embodiments can be contemplated within the scope of the invention in which the slots for the field and armature windings are shaped and/or positioned within the stator such that the thickness of the back iron behind each armature winding slot is greater than the thickness of the back iron behind each field winding slot so as to reduce the iron losses due to the flux reversals in the stator behind the armature winding slots.

What is claimed is:

1. An electrical machine comprising a rotor (79, 89) without windings, a stator (78, 88) having armature windings comprising at least two coils $(A_1, A_2)$ having active portions positioned with armature winding slots (81, 91) in a stator iron, and field windings (F) having active portions positioned within field winding slots (80, 90) in the stator iron so as to generate magnetomotive forces in direction s extending transversely of the magnetomotive forces generated by the armature windings, and circuit means for controlling the currents in the coils $(A_1, A_2)$ in synchronism with rotation of the rotor such that periods in which a magnetomotive force is generated in one direction by current flow in one of the coils alternate with periods in which a magnetomotive force is generated in the opposite direction by current flow in another of the coils, characterised in that the armature winding slots and the field winding slots are equal in number and alternate with one another in the stator iron, and in that, considering the width of each slot (80, 81, 90, 91) as being the maximum extent of the slot in the direction of rotation of the rotor and considering the depth of each slot as being the maximum extent of the slot radially of the rotor and the thickness of the back iron behind the slot as being the distance between the maximum extent of the slot and the maximum extent of the armature iron along the same radial direction, the width of each armature winding slot (81, 91) is greater than the width of each field winding slot (80, 90) and the thickness of the back iron behind each armature winding slot (81, 91) is greater than the thickness of the back iron behind each field winding slot (80, 90).

2. A machine according to claim 1, wherein the coils $(A_1, A_2)$ are closely coupled magnetically.

3. A machine according to claim 1, wherein the thickness of the back iron behind each armature winding slot (81, 91)

is at least 10% greater than the thickness of the back iron behind each field winding slot (80, 90).

4. A machine according to claim 1, wherein the thickness of the back iron behind each armature winding slot (81, 91) is up to 100% greater than the thickness of the back iron behind each field winding slot (80, 90).

5. A machine according to claim 1, wherein the width of each armature winding slot (81, 91) is greater than the width of each field winding slot (80, 90) by between about 20% and 80%.

6. A machine according to any preceding claim, wherein the depth of each armature winding slot (81, 91) is less than the depth of each field winding slot (80, 90).

7. A machine according to any preceding claim, wherein each slot (80, 81, 90, 91) has a neck opening towards the rotor (79, 89) between adjacent poles on the stator (78, 88).

8. A machine according to claim 1, wherein the stator (78) has a substantially circular cross-section and the depth of each armature winding slot (81) is less than the depth of each field winding slot (80) in order to provide a greater thickness of back iron behind each armature winding slot.

9. A machine according to claim 1, wherein the stator (88) has a substantially polygonal cross-section with corners (86), and the active portions of the armature winding slots (91) are located adjacent the corners in order to provide a greater thickness of back iron behind each armature winding slot.

10. A machine according to claim 1, wherein the stator (78, 88) has a plurality of poles and the armature windings are wound with a pitch corresponding to a plurality of pole pitches.

* * * * *